(12) United States Patent
Chen

(10) Patent No.: US 7,287,928 B2
(45) Date of Patent: Oct. 30, 2007

(54) SWING STRUCTURE FOR A WHEEL SET

(75) Inventor: Ting-Hsing Chen, Tainan Hsien (TW)

(73) Assignee: Far Great Plastics Industrial Co., Ltd., Tainan Hsein (TW)

( * ) Notice: Subject to any disclaimer, the term of this patent is extended or adjusted under 35 U.S.C. 154(b) by 190 days.

(21) Appl. No.: 11/183,787

(22) Filed: Jul. 19, 2005

(65) Prior Publication Data
US 2007/0020042 A1    Jan. 25, 2007

(51) Int. Cl.
*B60G 7/02* (2006.01)
(52) U.S. Cl. ............ 403/162; 403/67; 403/71; 403/161; 403/163; 280/87.042; 280/87.05
(58) Field of Classification Search .......... 403/67, 403/71, 119, 161, 162, 63, 164, 163; 280/87.041, 280/87.042, 87.05
See application file for complete search history.

(56) References Cited

U.S. PATENT DOCUMENTS 4,684,280 A * 8/1987 Dirkin et al. .......... 403/161
6,793,224 B2 * 9/2004 Stratton ............. 280/87.042
7,121,566 B2 * 10/2006 McClain ............ 280/87.042
7,226,081 B2 * 6/2007 Chen .................... 280/771
2006/0192358 A1 * 8/2006 Chen ................. 280/87.041

* cited by examiner

*Primary Examiner*—Jennifer H. Gay
*Assistant Examiner*—Michael P. Ferguson
(74) *Attorney, Agent, or Firm*—Rosenberg, Klein & Lee

(57) ABSTRACT

A swing structure for a wheel set includes a central tube, an axial tube, a spacer, a sleeve, and a fastener. The central tube is provided with a ring plate at the rear end. The ring plate is formed with a through hole thereon. A connection cylinder is disposed at the middle section of the axial tube. The connection cylinder has one end provided with a ring plate. The ring plate of the connection cylinder has a through hole for the sleeve to insert through. The spacer has a through hole for the sleeve to insert through. The sleeve is hollow for the fastener to insert through. The fastener inserts through the sleeve and is secured in the through hole of the ring plate of the central tube.

2 Claims, 4 Drawing Sheets

SWING STRUCTURE FOR A WHEEL SET

BACKGROUND OF THE INVENTION (a) Field of the Invention

The present invention relates to a swing structure for a wheel set applied to a kick scooter or a children's tricycle, which is free to swing at a certain angle without the risk of turning over.

(b) Description of the Prior Art

Whether two wheels are used in the front or in the rear on certain kick scooters or children's tricycles, a single-wheel turning mechanism is adopted. In case of a wild turning, either of the front or rear wheels, i.e., the outside one, can easily leave the ground to cause the scooter to turn over. Therefore, it is necessary to limit the swing angle to stay within a safe range.

Furthermore, when driving on a rough road, the scooter tends to be elevated higher on one side to cause the standing board of the scooter is to be inclined, making the rider of the scooter uncomfortable.

SUMMARY OF THE INVENTION

The primary purpose of the present invention is to provide a swing structure for a wheel set, which is free to swing at a certain angle, free of risk of turning over due to wild swing, compact in construction and at low production cost. To achieve the purpose, the present invention includes a central tube, an axial tube, a spacer, a sleeve, and a fastener. A ring plate having a through hole is disposed at the rear end of the central tube. A connection cylinder is disposed at the middle section of the axial tube. One end of the connection cylinder is provided with a ring plate having a through hole for the sleeve to insert through. The spacer has a through hole for the sleeve to insert through. The sleeve is hollow for the fastener to insert through. Accordingly, the fastener inserts through the sleeve and is secured in the through hole of the ring plate disposed at the rear end of the central tube. The through hole of the ring plate of the central tube is a threaded hole and the fastener is a bolt.

DETAILED DESCRIPTION OF THE PREFERRED EMBODIMENT

Figure 1:
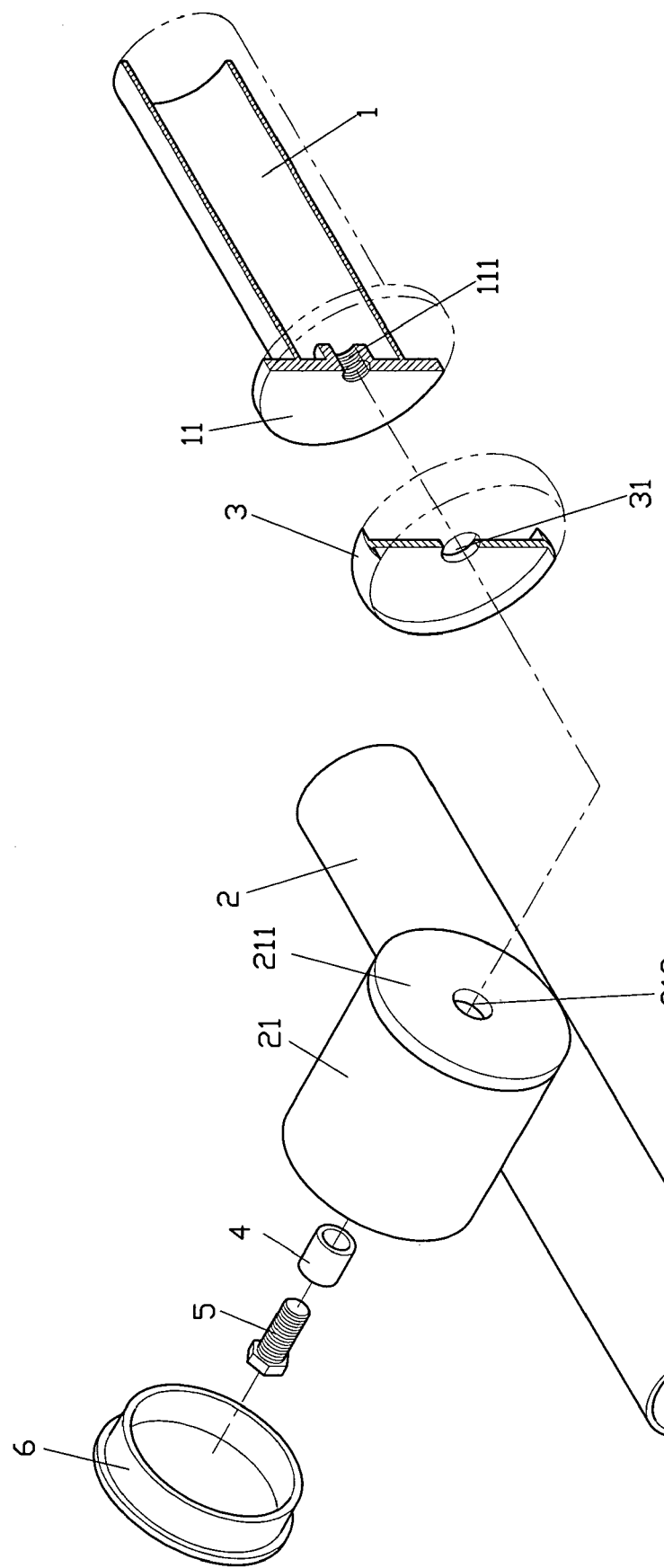
FIG. 1 is an exploded view of a preferred embodiment of the present invention.
Figure 2:
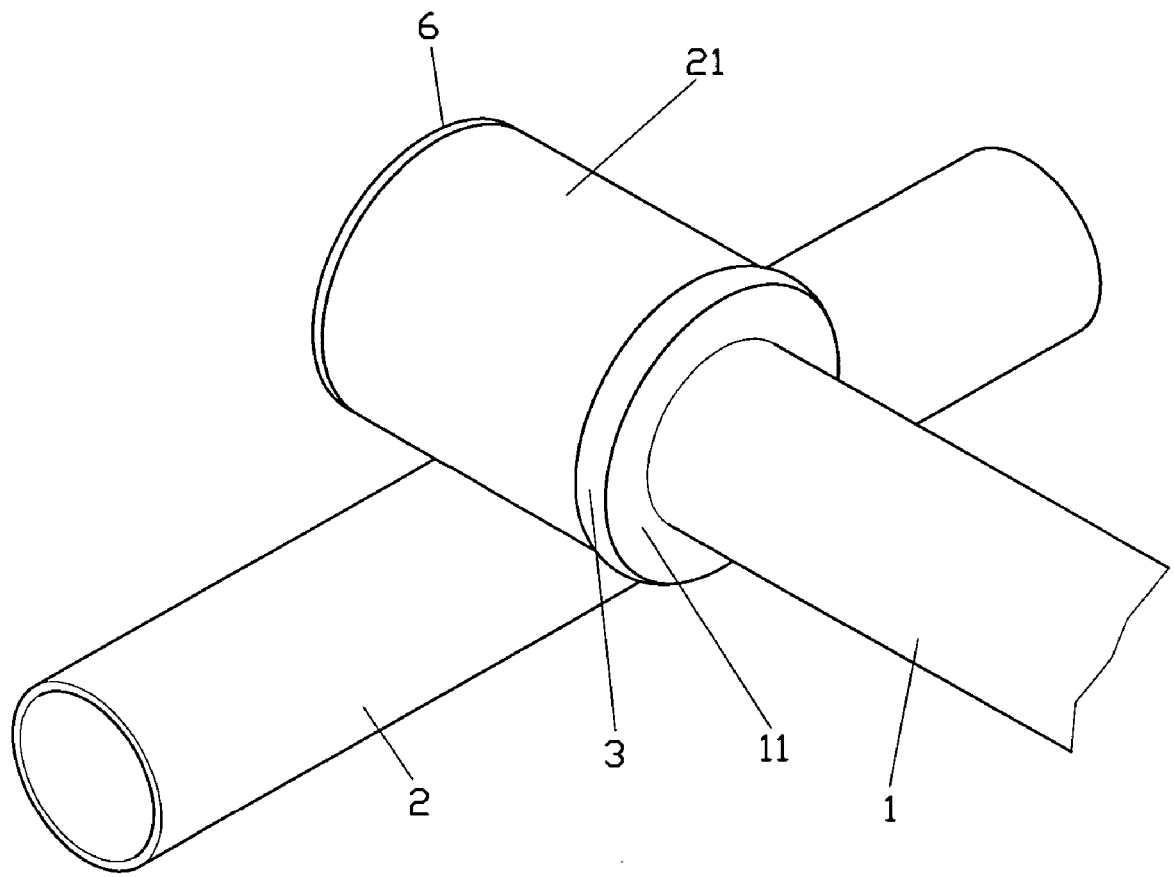
FIG. 2 is a perspective view of the preferred embodiment of the present invention as assembled.

Referring to FIGS. 1 and 2, a preferred embodiment of the present invention comprises a central tube (1), an axial tube (2), a spacer (3), a sleeve (4), a fastener (5) and a tube plug (6).

A ring plate (11) is provided at the rear end of the central tube (1). A through hole (111) is disposed on the ring plate (11). In this embodiment, the through hole (111) is a threaded hole.

A connection cylinder (21) is provided at the middle section of the axial tube (2). One end of the connection cylinder (21) is provided with a ring plate (211). A through hole (212) is disposed on the ring plate (211) for the sleeve (4) to insert through.

The spacer (3) is made of plastic material and has a through hole (31) for the sleeve (4) to insert through.

The sleeve (4) is hollow for the fastener (5) to insert through.

The fastener (5) is a bolt in this embodiment.

The tube plug (6) is to cover up the connection cylinder (21).

Figure 3:
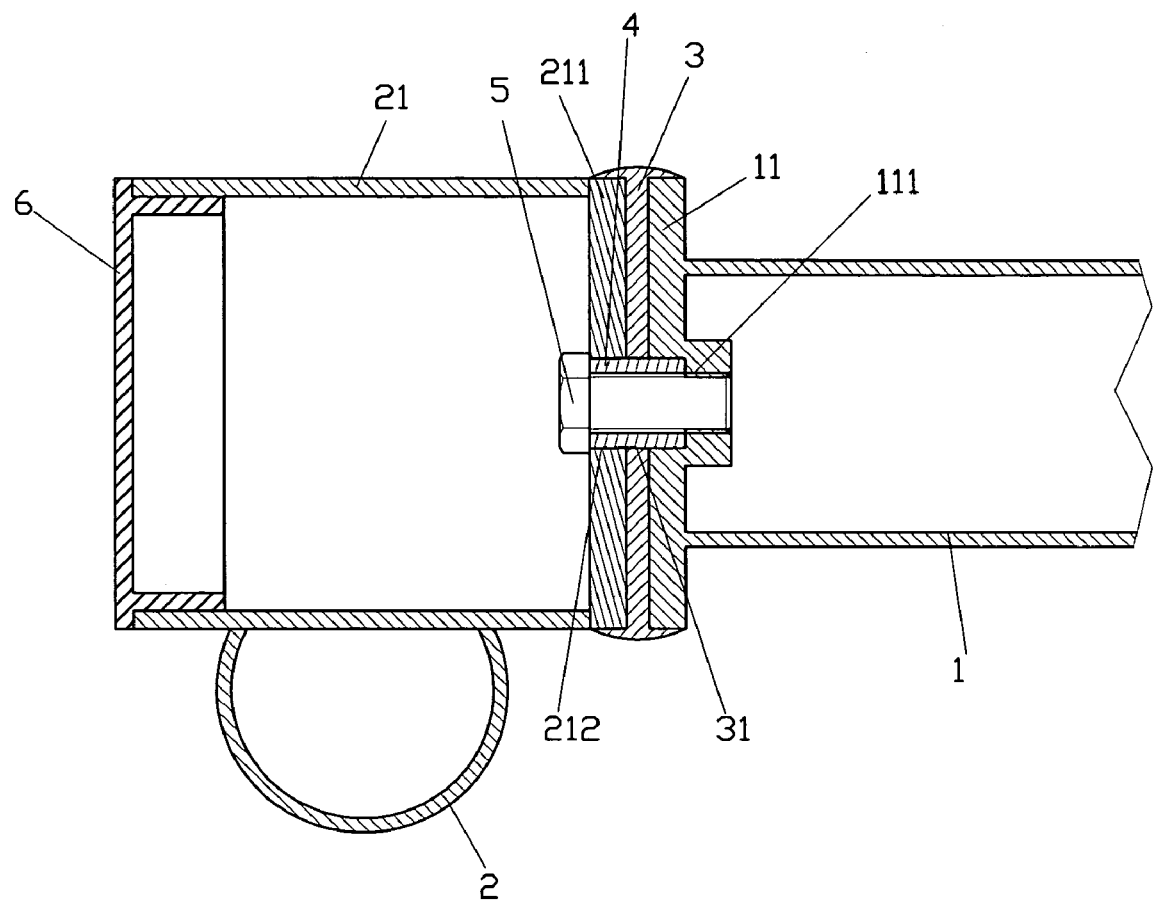
FIG. 3 is a cross-sectional view of the preferred embodiment of the present invention.

As shown in FIG. 3, the fastener (5) inserts through the sleeve (4) and is fastened in the through hole (111) of the ring plate (11) of the central tube (1), so that the connection cylinder (21) of the axial tube (2) is pivotally connected to the central tube (1) and the spacer (3). The tube plug (6) covers up the connection cylinder (21). Accordingly, the connection cylinder (21) of the axial tube (2) is allowed to swing in relation with the central tube (1). The spacer (3) disposed between the ring plate (211) of the connection cylinder (21) and the ring plate (11) of the central tube (1) provides proper tightness and wear-resisting performance.

Figure 4:
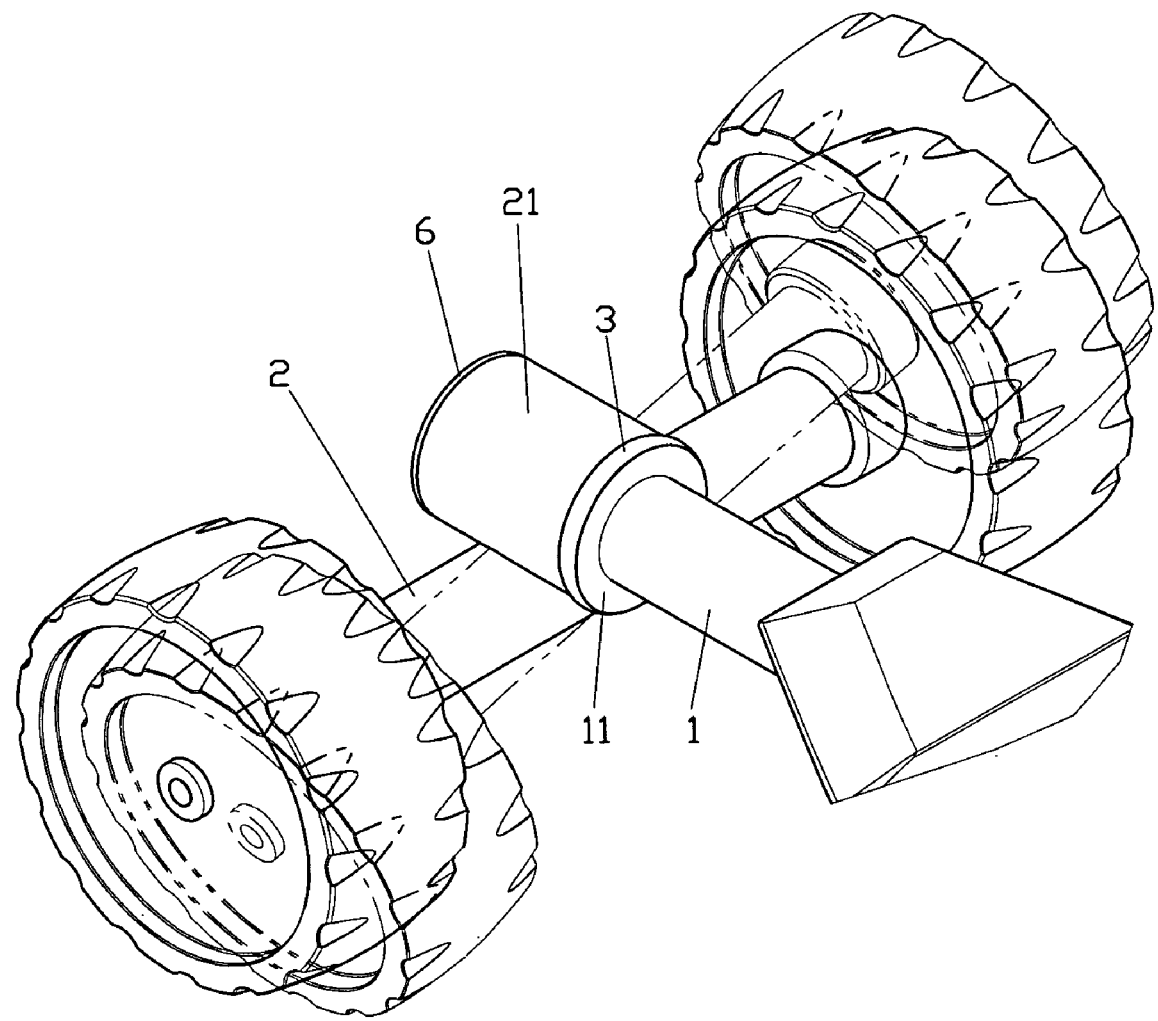
FIG. 4 is a perspective view of the preferred embodiment of the present invention in an operating status.

As illustrated in FIG. 4, the preferred embodiment of the present invention is applied to the rear wheel set of a kick scooter. When the scooter is taking a turn or driving on a rough road, the rear wheel set swings in safe and free fashion within the range of a certain angle without the risk of turning over due to wild swing.

I claim:

1. A swing structure for a rear wheel set, comprising suspension tube, an axial tube, a spacer, a sleeve, and a fastener;

said central tube extending longitudinally and having a first ring plate at a rear end of said central tube, said first ring plate having a first through hole formed therein extending in said longitudinal direction for receiving a portion of said sleeve;

said axial tube extending transversely with respect to said central tube, said rear wheel set being pivotably supported at opposing ends of said axial tube, and having a connection cylinder rigidly disposed at a middle section thereof extending in said longitudinal direction, said connection cylinder having a second ring plate at one end thereof, said second ring plate having a second through hole formed therein extending in said longitudinal direction for receiving a portion of said sleeve therein, said second ring plate being disposed adjacent said first ring plate with said first and second through holes being in aligned relationship;

said spacer being disposed between said first and second ring plates having a third through hole aligned with said first and second through holes in said longitudinal direction for receiving a portion of said sleeve therein; and said sleeve being hollow for passage of said fastener therethrough into said first through hole when said sleeve is received within said first, second and third through holes to provide a pivotal coupling between said connection cylinder and said central tube; whereby said axial tube is pivotable about a longitudinal axis defined by said pivotal coupling.

2. A swing structure for a rear wheel set of claim 1, wherein said first through hole is a threaded hole and said fastener is a bolt.

* * * * *